(12) United States Patent
Gray

(10) Patent No.: US 11,164,143 B1
(45) Date of Patent: Nov. 2, 2021

(54) AUTOMATED DRY-CLEANING PICKUP

(71) Applicant: Willie Gray, Chicago, IL (US)

(72) Inventor: Willie Gray, Chicago, IL (US)

( * ) Notice: Subject to any disclaimer, the term of this patent is extended or adjusted under 35 U.S.C. 154(b) by 315 days.

(21) Appl. No.: 16/411,264

(22) Filed: May 14, 2019

(51) Int. Cl.
| | | |
|---|---|---|
| G06Q 10/08 | (2012.01) |
| D06F 95/00 | (2006.01) |
| G07C 9/00 | (2020.01) |
| G07C 9/28 | (2020.01) |
| G07F 9/00 | (2006.01) |

(52) U.S. Cl.
CPC ......... *G06Q 10/0836* (2013.01); *D06F 95/00* (2013.01); *G07C 9/00182* (2013.01); *G07C 9/28* (2020.01); *G07F 9/002* (2020.05); *G07C 2009/0019* (2013.01)

(58) Field of Classification Search
CPC ....... G07F 9/002; G07C 9/28; G07C 9/00182; G07C 2009/0019; D06F 95/00
USPC .......... 340/5.7; 705/339; 235/383, 375, 381, 235/385
See application file for complete search history.

(56) References Cited

U.S. PATENT DOCUMENTS

| | | | | |
|---|---|---|---|---|
| 4,803,348 | A * | 2/1989 | Lohrey | G07F 9/02 |
| | | | | 235/381 |
| 5,255,449 | A * | 10/1993 | Nakamura | D06F 95/00 |
| | | | | 34/603 |
| 5,509,572 | A | 4/1996 | Curtis | |
| 5,660,261 | A * | 8/1997 | Speckhart | B65G 47/61 |
| | | | | 198/357 |
| 6,010,239 | A | 1/2000 | Hardgrave | |
| 6,578,671 | B2 | 6/2003 | Shen | |
| 7,245,988 | B1 * | 7/2007 | Terepka | D06F 93/00 |
| | | | | 198/349.6 |
| 7,886,971 | B2 | 2/2011 | Cassady | |
| D659,917 | S | 5/2012 | Jeon | |
| 8,751,035 | B2 | 6/2014 | Janet | |
| 9,120,624 | B1 | 9/2015 | Cassady | |
| 9,330,558 | B2 * | 5/2016 | Logan | D06F 39/00 |
| 9,472,044 | B2 * | 10/2016 | Odisho | G07F 7/08 |
| 9,493,902 | B2 * | 11/2016 | Del Pos | D06F 39/125 |
| 10,743,693 | B2 * | 8/2020 | Newcomb | G07C 9/00896 |
| 2007/0251990 | A1 * | 11/2007 | LeNorman | G07F 17/20 |
| | | | | 235/375 |
| 2007/0261997 | A1 * | 11/2007 | Cassady | B07C 5/3412 |
| | | | | 209/3.3 |
| 2017/0083885 | A1 * | 3/2017 | Khadgi | G06Q 20/208 |

FOREIGN PATENT DOCUMENTS

CA        1289247        9/1991

* cited by examiner

*Primary Examiner* — Nam V Nguyen
(74) *Attorney, Agent, or Firm* — Kyle A. Fletcher, Esq.

(57) ABSTRACT

The automated dry-cleaning pickup is a kiosk. The automated dry-cleaning pickup is configured for use with a dry cleaning building. The automated dry-cleaning pickup distributes one or more dry cleaned apparel items to a client of the dry cleaning building. The automated dry-cleaning pickup comprises an antechamber, a door, and an access control system. The antechamber contains the one or more dry cleaned apparel items for delivery. The door controls the access of the client into the antechamber. The access control system: a) identifies the one or more dry cleaned apparel items requested by the client; b) locates and transports the identified one or more dry cleaned apparel items from a storage location to the antechamber; and, c) unlocks the door such that the client has access to the one or more dry cleaned apparel items in the antechamber.

19 Claims, 6 Drawing Sheets

AUTOMATED DRY-CLEANING PICKUP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of textiles including the treatment and laundering of textiles, more specifically, a laundry system comprising an arrangement of devices and structures. (D06F95/00)

SUMMARY OF INVENTION

The automated dry-cleaning pickup is a kiosk. The automated dry-cleaning pickup is configured for use with one or more dry cleaned apparel items. The automated dry-cleaning pickup is configured for use with a dry cleaning building or structure. The automated dry-cleaning pickup distributes the one or more dry cleaned apparel items to a client of the dry cleaning building. The automated dry-cleaning pickup comprises an antechamber, a door, and an access control system. The antechamber contains the one or more dry cleaned apparel items for delivery. The door controls the access of the client into the antechamber. The access control system: a) identifies the one or more dry cleaned apparel items requested by the client; b) locates and transports the identified one or more dry cleaned apparel items from a storage location to the antechamber; and, c) unlocks the door such that the client has access to the one or more dry cleaned apparel items in the antechamber.

These together with additional objects, features and advantages of the automated dry-cleaning pickup will be readily apparent to those of ordinary skill in the art upon reading the following detailed description of the presently preferred, but nonetheless illustrative, embodiments when taken in conjunction with the accompanying drawings.

In this respect, before explaining the current embodiments of the automated dry-cleaning pickup in detail, it is to be understood that the automated dry-cleaning pickup is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated dry-cleaning pickup.

It is therefore important that the claims be regarded as including such equivalent construction insofar as they do not depart from the spirit and scope of the automated dry-cleaning pickup. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The automated dry-cleaning pickup is a kiosk. The automated dry-cleaning pickup is configured for use with one or more dry cleaned apparel items. The automated dry-cleaning pickup is configured for use with a dry cleaning building. The automated dry-cleaning pickup distributes the one or more dry cleaned apparel items to a client of the dry cleaning building. The automated dry-cleaning pickup comprises an antechamber, a door, and an access control system. The antechamber contains the one or more dry cleaned apparel items for delivery. The door controls the access of the client into the antechamber. The access control system: a) identifies the one or more dry cleaned apparel items requested by the client; b) locates and transports the identified one or more dry cleaned apparel items from a storage location to the antechamber; and, c) unlocks the door such that the client has access to the one or more dry cleaned apparel items in the antechamber.

Figure 1:
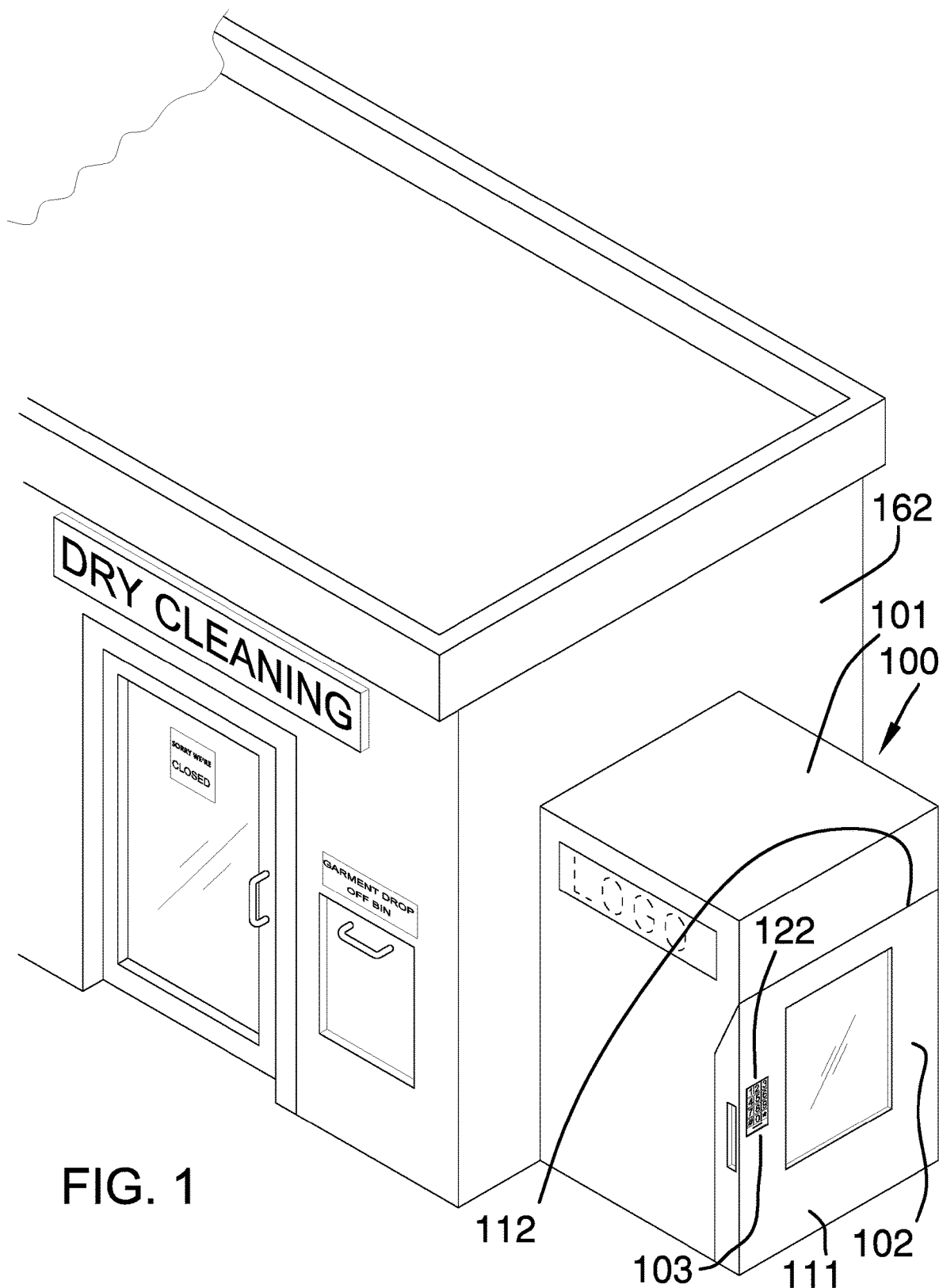
FIG. 1 is a perspective view of an embodiment of the disclosure.
Figure 2:
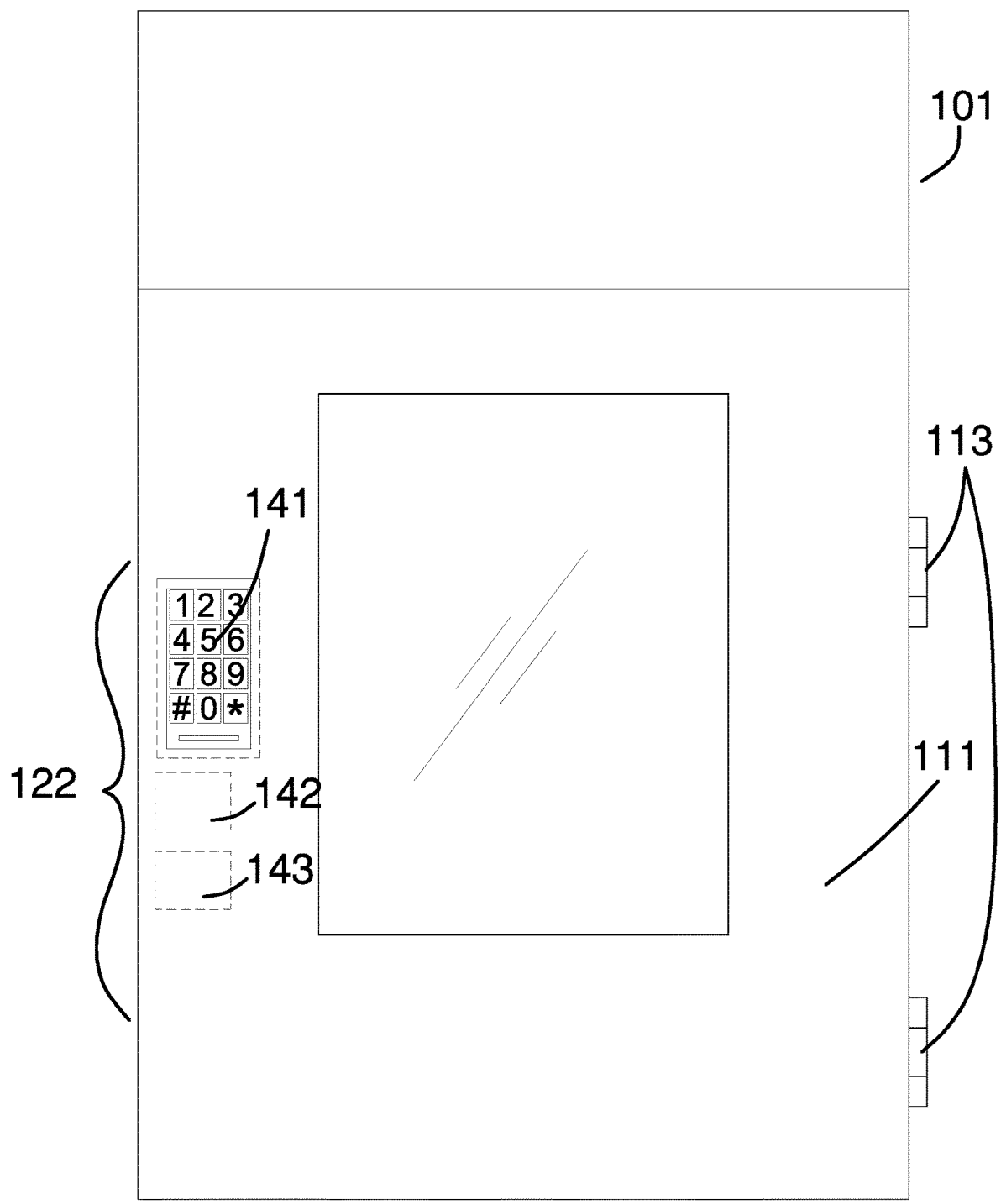
FIG. 2 is a front view of an embodiment of the disclosure.
Figure 3:
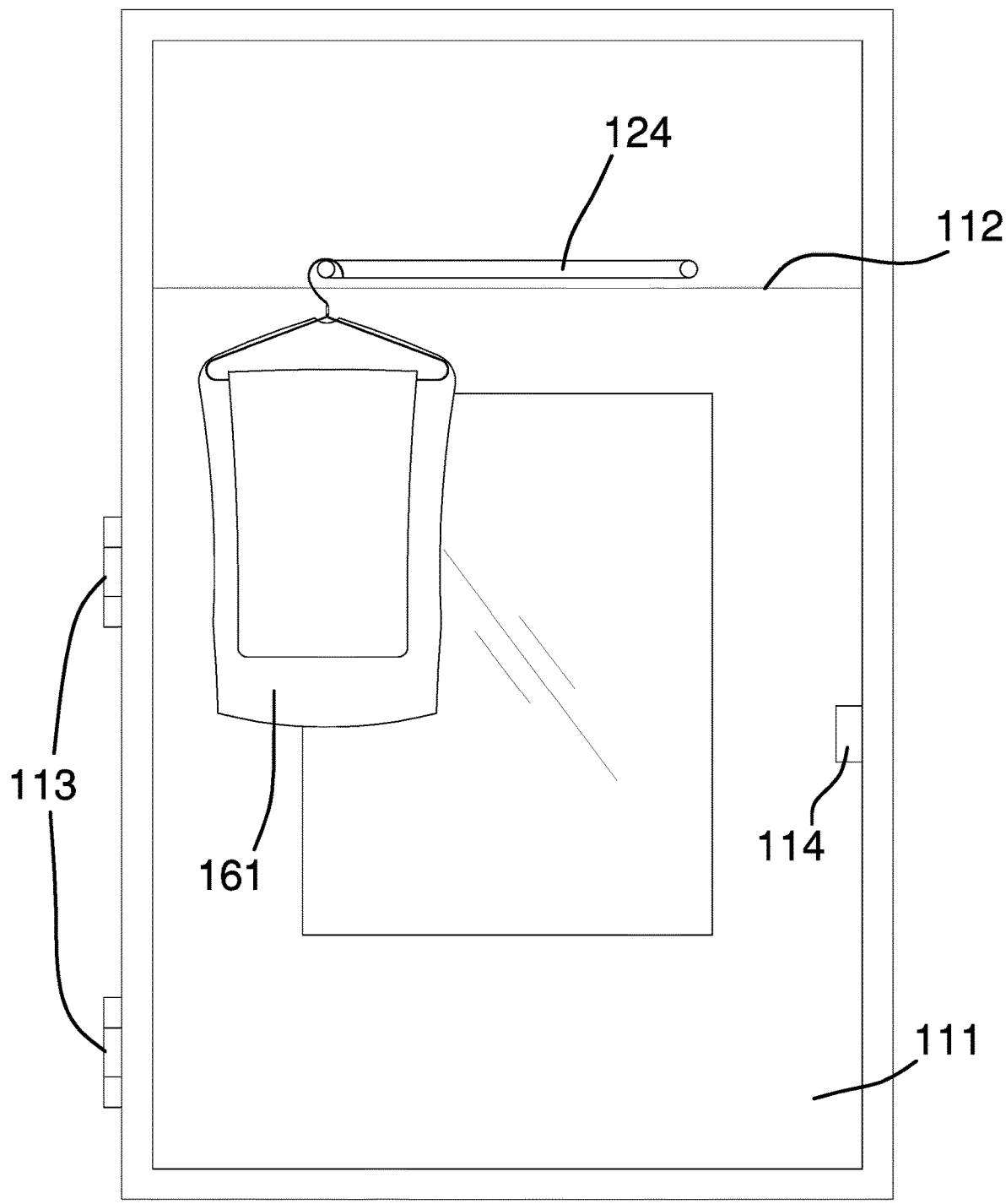
FIG. 3 is a rear view of an embodiment of the disclosure.
Figure 4:
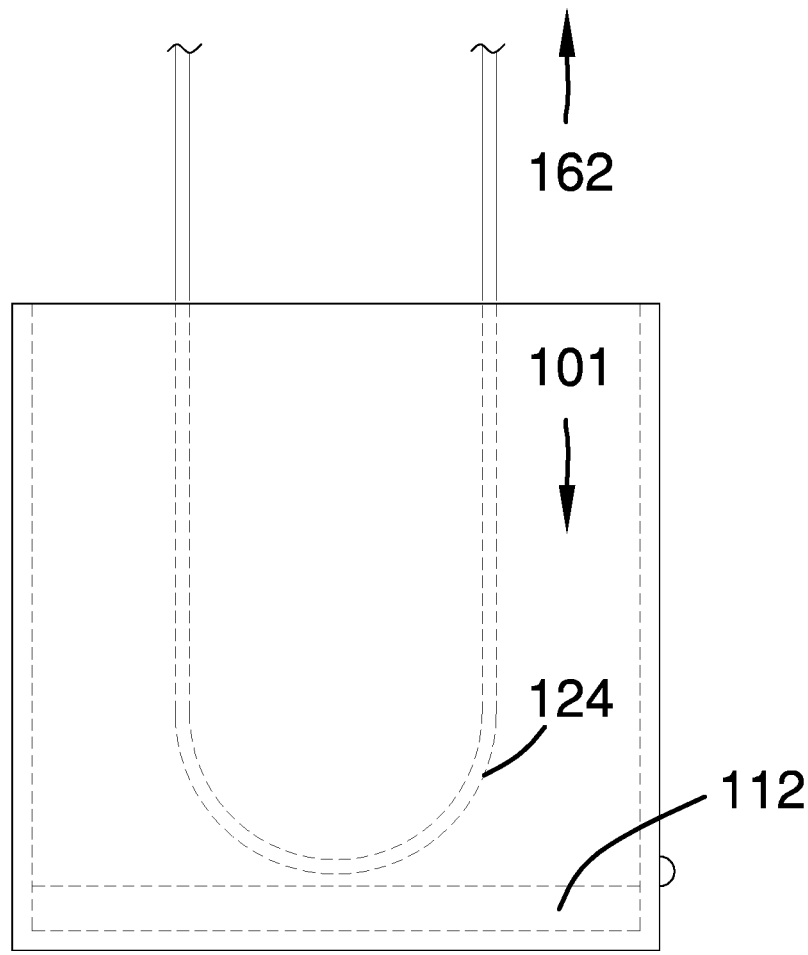
FIG. 4 is a top view of an embodiment of the disclosure.
Figure 5:
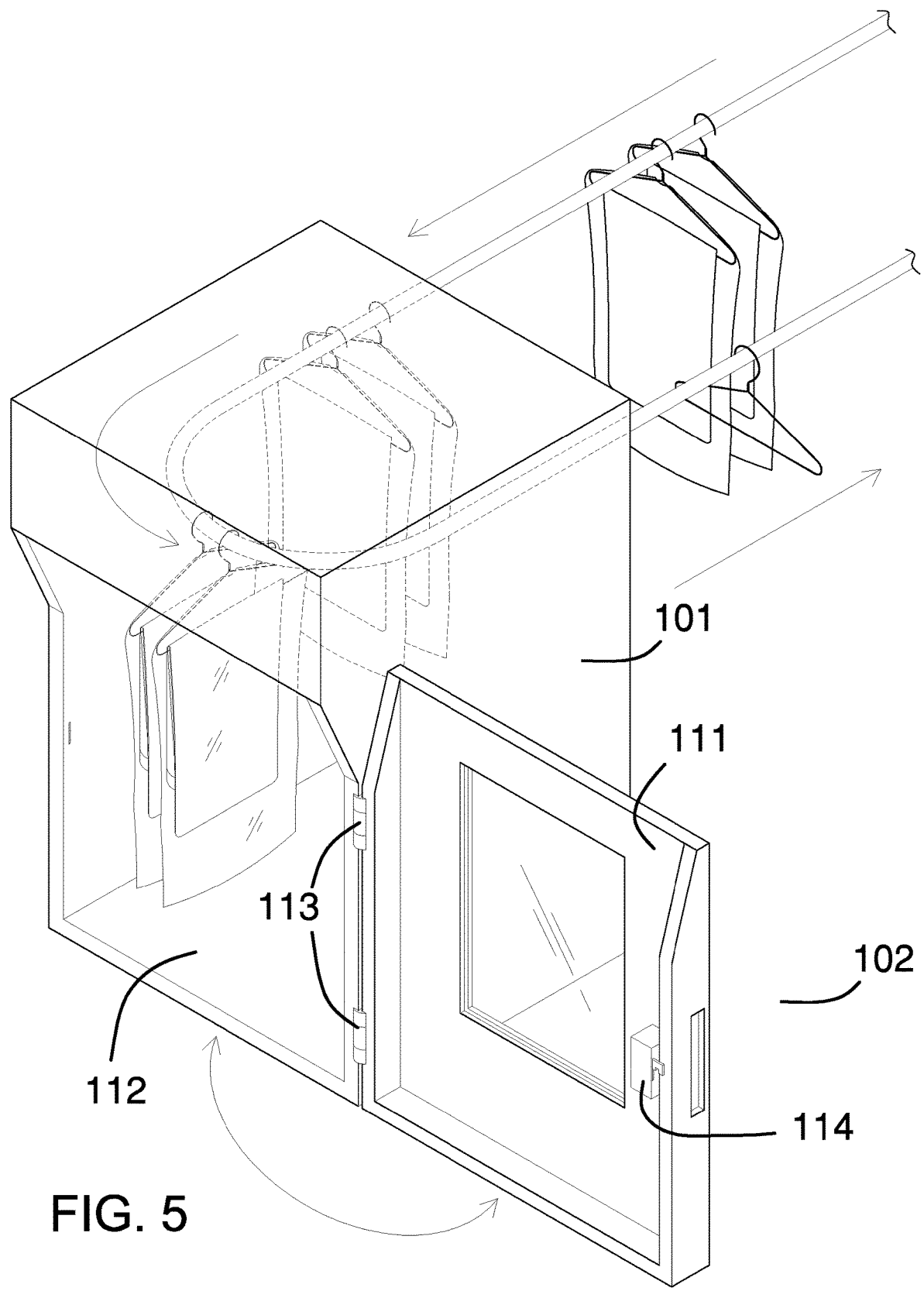
FIG. 5 is an in-use view of an embodiment of the disclosure.
Figure 6:
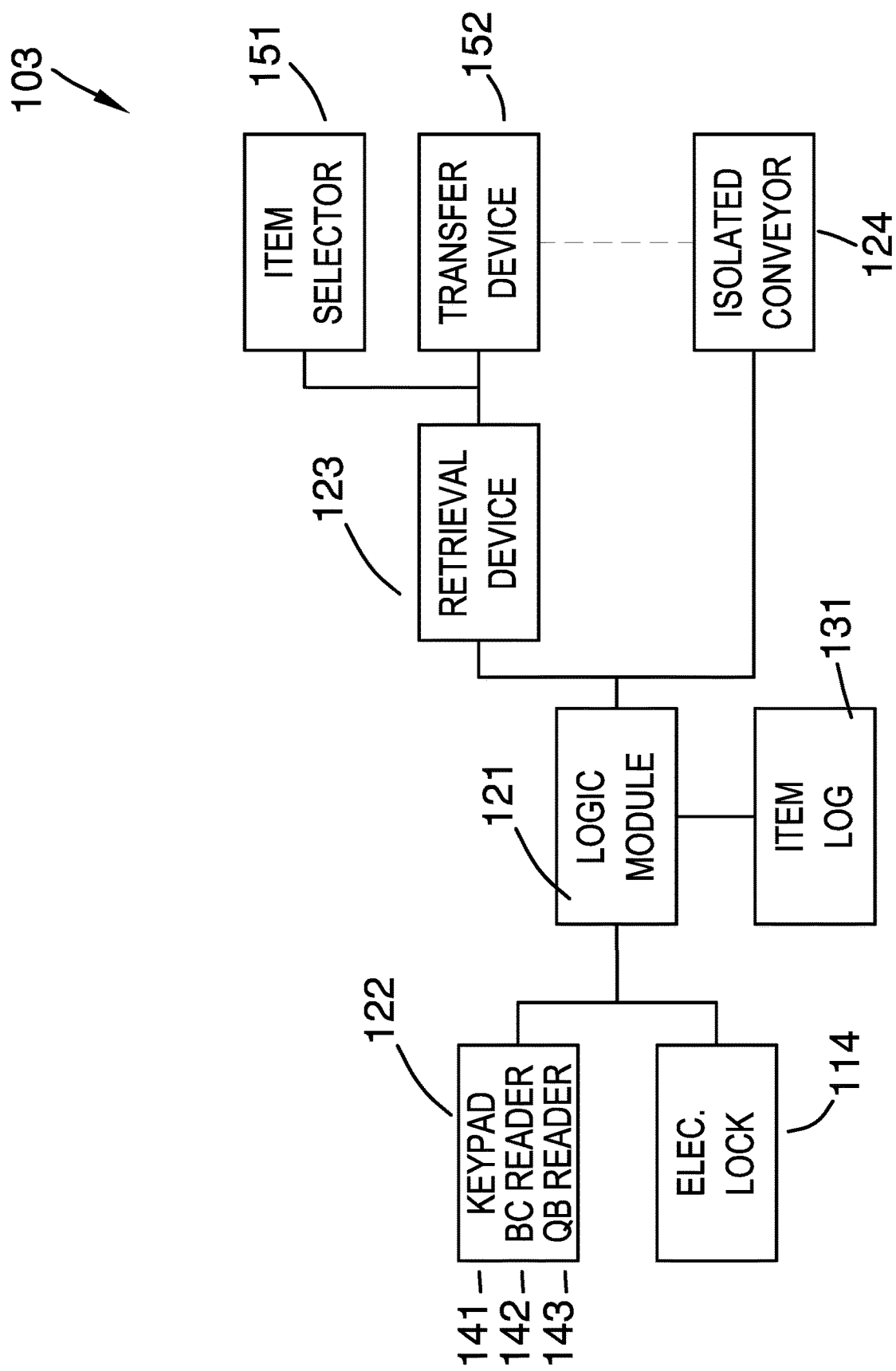
FIG. 6 is a block diagram of an embodiment of the disclosure.

Specification:

Detailed reference will now be made to one or more potential embodiments of the disclosure, which are illustrated in FIGS. 1 through 6.

The automated dry-cleaning pickup 100 (hereinafter invention) is a kiosk. The invention 100 is configured for use with one or more dry cleaned apparel items 161. The invention 100 is configured for use with a dry cleaning building. The invention 100 distributes the one or more dry cleaned apparel items 161 to a client of the dry cleaning building. The invention 100 comprises an antechamber 101, a door 102, and an access control system 103. The antechamber 101 contains the one or more dry cleaned apparel items 161 for delivery. The door 102 controls the access of the client into the antechamber 101. The access control system 103: a) identifies the one or more dry cleaned apparel items 161 requested by the client; b) locates and transports the identified one or more dry cleaned apparel items 161 from a storage location to the antechamber 101; and, c) unlocks the door 102 such that the client has access to the one or more dry cleaned apparel items 161 in the antechamber 101.

The one or more dry cleaned apparel items 161 refer to garments that have been professionally cleaned and are ready to be returned to their owner.

The antechamber 101 is an enclosed space. The antechamber 101 is accessible from a larger structure 162 commonly referred to as a building. The one or more dry cleaned apparel items 161 claimed by the client are brought into the antechamber 101 by the access control system 103 before the one or more dry cleaned apparel items 161 are placed in the custody of the client. Access into the antechamber 101 from the exterior of the larger structure 162 is controlled by the door 102. Access into the interior of the larger structure 162 through the antechamber 101 is prevented by a barrier. Such barriers are well-known and documented in the construction arts.

The door 102 is a rotating barrier plate 111. The door 102 encloses an aperture 112 into the barrier plate 111. The door 102 controls access into the antechamber 101. The door 102 comprises a barrier plate 111, an aperture 112, a hinge 113, and an electronic lock 114.

The aperture 112 is an opening that is formed through an exterior surface of the antechamber 101. The aperture 112 provides access into the antechamber 101 such that the one or more dry cleaned apparel items 161 requested by the client can be removed from the antechamber 101 through the aperture 112.

The barrier plate 111 is a disk-shaped structure. The barrier plate 111 is a plate structure that encloses the aperture 112. The barrier plate 111 attaches to the antechamber 101 such that the barrier plate 111 rotates between a closed position and an open position relative to the aperture 112.

The hinge 113 is a hardware item. The hinge 113 is a rotating fastening structure. The hinge 113 attaches the door to the antechamber 101 such that the position of the door 102 rotates relative to the antechamber 101.

The electronic lock 114 is an electromechanical system. The access control system 103 controls the operation of the electronic lock 114. The electronic lock 114 locks the barrier plate 111 in the closed position until the one or more dry cleaned apparel items 161 identified by a client are positioned within the antechamber 101. When the requested one or more dry cleaned apparel items 161 are positioned in the antechamber 101, the access control system 103 releases the electronic lock 114 such that the client can rotate the barrier plate 111 from the closed position to the open position to gain access to the one or more dry cleaned apparel items 161.

The access control system 103 controls the door 102 such that access into the antechamber 101 through the door 102 is controlled by the access control system 103. The access control system 103 is an electromechanical system. The access control system 103 identifies the one or more dry cleaned apparel items 161 requested by a client. The access control system 103 locates and transports the identified one or more dry cleaned apparel items 161 from a storage location to the antechamber 101. The access control system 103 unlocks the door 102 such that the client has access to the one or more dry cleaned apparel items 161 contained in the antechamber 101. The access control system 103 comprises a logic module 121, a plurality of identification devices 122, a retrieval device 123, and an isolated conveyor 124. The logic module 121, the plurality of identification devices 122, the retrieval device 123, and the isolated conveyor 124 are electrically interconnected.

The logic module 121 is a programmable electrical device. The logic module 121 monitors the plurality of identification devices 122 in order to identify the one or more dry cleaned apparel items 161 requested by the client. The logic module 121 locates and transports the identified one or more dry cleaned apparel items 161 from a storage location to the antechamber 101. The logic module 121 unlocks the door 102 such that the client has access to the one or more dry cleaned apparel items 161 contained in the antechamber 101. The logic module 121 controls the operation of each of the plurality of identification devices 122. The logic module 121 controls the operation of the retrieval device 123. The logic module 121 controls the operation of the isolated conveyor 124. The logic module 121 controls the operation of the electronic lock 114. The logic module 121 maintains an item log 131.

The logic module 121 further comprises an item log 131. The item log 131 is a database table that relates the one or more dry cleaned apparel items 161 to a serial number captured by the identification device selected from the plurality of identification devices 122 that is provided by the client. The logic module 121 identifies the one or more dry cleaned apparel items 161 requested by the client through the use of the data contained in the item log 131.

Each of the plurality of identification devices 122 is an electrical device. Each of the plurality of identification devices 122 is configured to receive from the client the identification information associated with the one or more dry cleaned apparel items 161 desired by the client. The plurality of identification devices 122 comprises one or more items selected from the group consisting of a keypad 141, a bar code reader 142, and a two dimensional marketing code reader 143.

The keypad 141 is an electrical device. The keypad 141 is a keyboard. The keypad 141 mounts on the exterior surface of the door 102. The logic module 121 monitors the keypad 141. The logic module 121 controls the operation of the keypad 141. The keypad 141 receives as manual input the serial number of the one or more dry cleaned apparel items 161 used by the logic module 121 to locate the one or more dry cleaned apparel items in the item log 131.

The bar code reader 142 is an electrical device. The bar code reader 142 is configured to read a bar code from a receipt presented by a client. The bar code reader 142 mounts on the exterior surface of the door 102. The logic module 121 monitors the bar code reader 142. The logic module 121 controls the operation of the bar code reader 142. The bar code reader 142 reads the serial number of the one or more dry cleaned apparel items 161 used by the logic module 121 to locate the one or more dry cleaned apparel items 161 in the item log 131.

The two dimensional marketing code reader 143 is an electrical device. The two dimensional marketing code reader 143 is configured to read a two dimensional marketing code from a personal data device presented by a client. An example of a two dimensional marketing code is a "QR" code. The two dimensional marketing code reader 143 mounts on the exterior surface of the door 102. The logic module 121 monitors the two dimensional marketing code reader 143. The logic module 121 controls the operation of the two dimensional marketing code reader 143. The two dimensional marketing code reader 143 reads the serial number of the one or more dry cleaned apparel items 161 used by the logic module 121 to locate the one or more dry cleaned apparel items 161 in the item log 131.

The retrieval device 123: a) collects the identified one or more dry cleaned apparel items 161; and, b) transports the identified one or more dry cleaned apparel items 161 to the isolated conveyor 124 for delivery to the client. The retrieval device 123 comprises an item selector 151 and a transfer device 152.

The isolated conveyor 124 is a conveyor. The isolated conveyor 124 is referred to as isolated because the isolated conveyor 124 is separated from any conveyors contained within the larger structure 162 for security purposes. The isolated conveyor 124 receives the one or more dry cleaned apparel items from the retrieval device 123 and transports the one or more dry cleaned apparel items 161 into the antechamber 101.

The item selector 151 is a mechanical device. The logic module 121 controls the operation of the item selector 151. The item selector 151 captures the one or more dry cleaned apparel items 161 from a location provided by the logic module 121 and transports the one or more dry cleaned apparel items 161 to the transfer device 152. Methods to design and fabricate an item selector 151 as described above are well-known and documented in the mechanical and electrical arts.

The transfer device 152 is a mechanical device. The logic module 121 controls the operation of the transfer device 152. The transfer device 152 receives the one or more dry cleaned apparel items 161 from the item selector 151 and transfers the one or more dry cleaned apparel items 161 to the isolated conveyor 124 for transportation to the antechamber 101.

Methods to design and fabricate a retrieval device 123 as described above are well-known and documented in the mechanical and electrical arts. Methods to design and fabricate a retrieval device 123 as described above are well-known and documented in the mechanical and electrical arts.

The following definitions were used in this disclosure:

Antechamber: As used in this disclosure, an antechamber is an enclosed chamber that controls access into a larger room, space, or chamber.

Automatic: As used in this disclosure, automatic refers to a device, process, or a system that operates without human control, supervision or participation in the operation of the device, process, or system.

Bar Code: As used in this disclosure, a bar code is a machine readable coding scheme that converts text-based information presented on an object into a machine readable format.

Chamber: As used in this disclosure, a chamber is an enclosed or enclosable negative space that is dedicated to a purpose.

Client: As used in this disclosure, a client is an individual who is designated to receive a service.

Closed Position: As used in this disclosure, a closed position refers to a movable barrier structure that is in an orientation that prevents passage through a port or an aperture. The closed position is often referred to as an object being "closed." Always use orientation.

Control System: As used in this disclosure, a control system is a first device or system that manages and regulates the behavior or operation of a second device or system.

Conveyor: As used in this disclosure, a conveyor is a mechanical device that forms a continuous rotating loop used to transport goods along the path of the loop structure of the conveyor.

Custody: As used in this disclosure, custody refers to an object or person that is under the physical control or care of a custodian. The custodian is an appropriate authority responsible for the proper operation, appropriate use, or well-being of the object or person that is in custody.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Door: As used in this disclosure, a door is a movable or removable barrier that is attached to a chamber for the purpose of allowing or preventing access through an aperture into the chamber.

Electronic Lock: As used in this disclosure, an electronic lock is an electromechanically operated lock that: 1) mechanically locks an object; and, 2) is secured and released using an electrical or electronically driven mechanism.

Garment: As used in this disclosure, a garment is a textile-based structure that is used to cover an individual. Clothes, clothing, and apparel are synonyms for garment.

Hardware: As used in this disclosure, refers to one or more incidental objects: 1) that are readily and commercially available; and, 2) that are associated with the installation, operation or maintenance of a primary object. Always use incidental.

Hinge: As used in this disclosure, a hinge is a device that permits the turning, rotating, or pivoting of a first object relative to a second object. A hinge designed to be fixed into a set position after rotation is called a locking hinge.

Incidental: As used in this disclosure, incidental refers to a second object that is associated with a first object but that: 1) does not significantly affect the characteristics of the first object; and, 2) the function of which can be readily replaced by or substituted with a third object.

Interface: As used in this disclosure, an interface is a physical or virtual boundary that separates two different systems across which information is exchanged.

Keyboard: As used in this disclosure, a keyboard is a panel that further comprises a plurality of buttons that are commonly referred to as keys. The keyboard is commonly used to operate devices including, but not limited to, logical devices and musical instruments.

Lock: As used in this disclosure, a lock is a device that prevents the unauthorized entry into a container or chamber.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Personal Data Device: As used in this disclosure, a personal data device is a handheld logical device that is used for managing personal information and communication. Examples of personal data device include, but are not limited to, cellular phones, tablets, and smartphones.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board or a plank.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Two Dimensional Marketing Code: As used in this disclosure, a 2 D marketing code is a machine readable coding scheme that is: 1) readily available through the public domain or a free licensing arrangement; 2) consists of an array of black or white squares; 3) is coded to direct the machine reading the two dimensional marketing code to an information resource, such as a web site, for information related to the two dimensional marketing code. A common two dimensional marketing code is a QR code.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An automated dry-cleaning pickup structure comprising:
   an antechamber, a door, and an access control system;
   wherein the antechamber contains the one or more dry cleaned apparel items for delivery;
   wherein the door attaches to the antechamber;
   wherein the control system controls the operation of the automated dry-cleaning pickup structure;
   wherein the automated dry-cleaning pickup structure is a kiosk;
   wherein the automated dry-cleaning pickup structure is configured for use with one or more dry cleaned apparel items;
   wherein the automated dry-cleaning pickup structure distributes the one or more dry cleaned apparel items;
   wherein the automated dry-cleaning pickup structure is configured for use with a dry cleaning building;
   wherein the access control system includes a retrieval device, and an isolated conveyor;
   wherein the retrieval device includes a transfer device;
   wherein the transfer device receives the one or more dry cleaned apparel items from an item selector and transfers the one or more dry cleaned apparel items to the isolated conveyor for transportation to the antechamber;
   wherein the isolated conveyor receives the one or more dry cleaned apparel items from the retrieval device and transports the one or more dry cleaned apparel items into the antechamber.

2. The automated dry-cleaning pickup structure according to claim 1
   wherein the one or more dry cleaned apparel items are garments;
   wherein the access control system is an electromechanical system;
   wherein the access control system identifies the one or more dry cleaned apparel items;
   wherein the access control system locates and transports the identified one or more dry cleaned apparel items from a storage location to the antechamber;
   wherein the access control system unlocks the door such to provide access to the one or more dry cleaned apparel items in the antechamber.

3. The automated dry-cleaning pickup structure according to claim 2
   wherein the antechamber is an enclosed space;
   wherein the antechamber is accessible from a larger structure;
   wherein the one or more dry cleaned apparel items are brought into the antechamber by the access control system.

4. The automated dry-cleaning pickup structure according to claim 3 wherein access into the antechamber from the exterior of the larger structure is controlled by the door.

5. The automated dry-cleaning pickup structure according to claim 4
   wherein the door is a rotating structure;
   wherein the door controls access into the antechamber.

6. The automated dry-cleaning pickup structure according to claim 5
   wherein the door comprises a barrier plate, an aperture, a hinge, and an electronic lock;
   wherein the barrier plate enclose the aperture;
   wherein the hinge attaches the barrier plate to the antechamber;

wherein the electronic lock secure the barrier plate in a closed position.

7. The automated dry-cleaning pickup structure according to claim 6
wherein the aperture is an opening that is formed through an exterior surface of the antechamber;
wherein the aperture provides access into the antechamber such that the one or more dry cleaned apparel items are removed from the antechamber through the aperture.

8. The automated dry-cleaning pickup structure according to claim 7
wherein the barrier plate is a disk-shaped structure;
wherein the barrier plate is a plate structure that encloses the aperture;
wherein the barrier plate attaches to the antechamber such that the barrier plate rotates between a closed position and an open position relative to the aperture;
wherein the hinge is a hardware item;
wherein the hinge is a rotating fastening structure;
wherein the hinge attaches the door to the antechamber such that the position of the door rotates relative to the antechamber.

9. The automated dry-cleaning pickup structure according to claim 8
wherein the electronic lock is an electromechanical system;
wherein the access control system controls the operation of the electronic lock;
wherein the electronic lock locks the barrier plate in the closed position until the one or more dry cleaned apparel items are positioned within the antechamber.

10. The automated dry-cleaning pickup structure according to claim 9
wherein the access control system comprises a logic module, a plurality of identification devices, the retrieval device, and the isolated conveyor;
wherein the logic module, the plurality of identification devices, the retrieval device, and the isolated conveyor are electrically interconnected.

11. The automated dry-cleaning pickup structure according to claim 10
wherein the logic module is a programmable electrical device;
wherein the logic module monitors the plurality of identification devices in order to identify the one or more dry cleaned apparel items;
wherein the logic module locates and transports the identified one or more dry cleaned apparel items from a storage location to the antechamber;
wherein the logic module unlocks the door to grant access to the one or more dry cleaned apparel items contained in the antechamber;
wherein the logic module controls the operation of each of the plurality of identification devices;
wherein the logic module controls the operation of the retrieval device;
wherein the logic module controls the operation of the isolated conveyor;
wherein the logic module controls the operation of the electronic lock.

12. The automated dry-cleaning pickup structure according to claim 11
wherein the logic module further comprises an item log;
wherein the item log is a database table that relates the one or more dry cleaned apparel items to a serial number captured by the identification device selected from the plurality of identification devices;
wherein the logic module identifies the one or more dry cleaned apparel items through the using of the serial number or using the database table contained in the item log.

13. The automated dry-cleaning pickup structure according to claim 12
wherein each of the plurality of identification devices is an electrical device;
wherein each of the plurality of identification devices is configured to receive the serial number associated with the one or more dry cleaned apparel items;
wherein the plurality of identification devices comprises one or more items selected from the group consisting of a keypad, a bar code reader, and a two dimensional marketing code reader;
wherein the keypad is an electrical device;
wherein the bar code reader is an electrical device;
wherein the two dimensional marketing code reader is an electrical device.

14. The automated dry-cleaning pickup structure according to claim 13
wherein the keypad is a keyboard;
wherein the keypad mounts on the exterior surface of the door;
wherein the logic module monitors the keypad;
wherein the logic module controls the operation of the keypad;
wherein the keypad receives as manual input the serial number of the one or more dry cleaned apparel items used by the logic module to locate the one or more dry cleaned apparel items in the item log.

15. The automated dry-cleaning pickup structure according to claim 14
wherein the bar code reader is configured to read a bar code;
wherein the bar code reader mounts on the exterior surface of the door;
wherein the logic module monitors the bar code reader;
wherein the logic module controls the operation of the bar code reader;
wherein the bar code reader reads the serial number of the one or more dry cleaned apparel items used by the logic module to locate the one or more dry cleaned apparel items in the item log.

16. The automated dry-cleaning pickup structure according to claim 15
wherein the two dimensional marketing code reader is configured to read a two dimensional marketing code;
wherein the two dimensional marketing code reader mounts on the exterior surface of the door;
wherein the logic module monitors the two dimensional marketing code reader;
wherein the logic module controls the operation of the two dimensional marketing code reader;
wherein the two dimensional marketing code reader reads the serial number of the one or more dry cleaned apparel items used by the logic module to locate the one or more dry cleaned apparel items in the item log.

17. The automated dry-cleaning pickup structure according to claim 16
wherein the retrieval device: a) collects the identified one or more dry cleaned apparel items; and, b) transports the identified one or more dry cleaned apparel items to the isolated conveyor for delivery;
wherein the isolated conveyor is a conveyor.

18. The automated dry-cleaning pickup structure according to claim 17 wherein the retrieval device comprises the item selector and the transfer device;

wherein the transfer device is a mechanical device;

wherein the logic module controls the operation of the transfer device.

19. The automated dry-cleaning pickup structure according to claim 18 wherein the item selector is a mechanical device;

wherein the logic module controls the operation of the item selector;

wherein the item selector captures the one or more dry cleaned apparel items from a location provided by the logic module and transports the one or more dry cleaned apparel items to the transfer device.

\* \* \* \* \*